US009298528B2

(12) United States Patent
Bond et al.

(10) Patent No.: US 9,298,528 B2
(45) Date of Patent: Mar. 29, 2016

(54) EVALUATING AND SERVICING PROBLEMATIC CASH-HANDLING MACHINES

(71) Applicant: Bank of America Corporation, Charlotte, NC (US)

(72) Inventors: Cheryl S. Bond, Fairview Heights, IL (US); Rebecca L. Bell, Kingsport, TN (US); Dion L. Bellamy, Weldon Spring, MO (US); Pat Burton, Ponte Vedra Beach, FL (US); Kristy M. Crist, Charlotte, NC (US); Carol Giordano, Massapequa Park, NY (US); James D. Goodwin, Gladstone, MO (US); Jeffrey Hipple, Charlotte, NC (US); Maggie M. Peretto, Hartford, CT (US); Devin D. Rhodes, Lexington, KY (US); Karen Y. Stavinoha, Murphy, TX (US); Susan A. Wilson, Dupo, IL (US)

(73) Assignee: Bank of America Corporation, Charlotte, NC (US)

( * ) Notice: Subject to any disclaimer, the term of this patent is extended or adjusted under 35 U.S.C. 154(b) by 177 days.

(21) Appl. No.: 13/648,782

(22) Filed: Oct. 10, 2012

(65) Prior Publication Data
US 2014/0101494 A1 Apr. 10, 2014

(51) Int. Cl.
*G06F 11/00* (2006.01)
*G06F 11/07* (2006.01)

(52) U.S. Cl.
CPC ........ *G06F 11/0751* (2013.01); *G06F 11/0733* (2013.01)

(58) Field of Classification Search
CPC .............. G06F 11/079; G06F 11/2257; G06F 11/0709; G06F 11/0793; G06F 11/0772; G06F 11/0781; G06F 11/0751; G06F 11/0733
USPC ....................................... 714/26, 48
See application file for complete search history.

(56) References Cited

U.S. PATENT DOCUMENTS

| 6,233,698 | B1 * | 5/2001 | Sakuma ....................... 714/6.32 |
|---|---|---|---|
| 7,200,779 | B1 * | 4/2007 | Coss et al. ....................... 714/48 |
| 2003/0065986 | A1 * | 4/2003 | Fraenkel et al. ................ 714/47 |
| 2005/0172171 | A1 * | 8/2005 | Kadashevich .................. 714/38 |
| 2005/0263583 | A1 * | 12/2005 | Schlabach .............. G06Q 10/06 235/379 |
| 2008/0141076 | A1 * | 6/2008 | Hu et al. .......................... 714/45 |
| 2010/0115345 | A1 * | 5/2010 | Childs et al. .................... 714/42 |
| 2012/0191503 | A1 * | 7/2012 | Heiman ................. G06Q 30/02 705/7.28 |

* cited by examiner

*Primary Examiner* — Yair Leibovich
(74) *Attorney, Agent, or Firm* — Banner & Witcoff, Ltd.; Michael A. Springs

(57) ABSTRACT

A method of tracking repeated performance problems in a machine is disclosed. The method comprises storing the faults in a computer memory, and assigning a classification value to the machine based on the frequency and number of the faults. Based on the classification value of the cash handing device it is determined whether the cash handing device needs to be serviced. The faults can be related to one of the hardware, the cash reject rate, image handling, crash rate, user claim rate, and check handling accuracy of the machine.

11 Claims, 7 Drawing Sheets

FIG. 3B

1. Cash handling device with *two or more* of the following hardware issues:
   i. 1 or more Chronic tickets in the past 7 days
   ii. 4 of 7 days > 30 minutes downtime (ANY category)
   iii. 3 consecutive days > 30 minutes downtime (same category)
   iv. Average Availability below 90% for the previous 2 months
   v. 2-week average Defect Rate > 4.0%
2. A Banking Center Single Site cash handling device with average monthly transaction volume >8000 that meets 1 factor, excluding factor a (Chronic ticket factor)
3. Cash handling device with Daily Cash Reject Rate > 10% for 5 or more days in a 7-day period
4. Cash handling device with >3 Check Images requested in 1 day
5. Cash handling device with 3 or more application reboots in a 7-day period
6. Cash handling device with 6 or more Deposit Claims in a 7-day period
7. Cash handling device with 5 or more missing check images (unmatched XMLs) in one day
8. Cash handling device with Daily Check Reject Rate > TBD% for 5 or more days in a 7-day period [placeholder]

*Chronic Ticket*
- A ticket is opened automatically when one of the conditions defined in the Chronic Threshold Table is met.
  Example: 5 dispenser failures in 5 days would automatically open a chronic dispenser failure ticket
- A ticket opened manually upon receipt of a executive complaint; however, the event will be placed into the defined process at the yellow stage and managed forward in accordance with the defined process.

*Repeat Chronic*
- A machine with multiple separate chronic occurrences within 60 days.
- A machine with an additional chronic occurrence more than 60 days from original date chronic is considered a new chronic occurrence.
- Machine must be installed/upgraded >60 days to qualify for Repeat Chronic process.
- Re-enters the Chronic process as Code Red.
- Cash handling device with 4 or more Chronic occurrences within a 60 day time span re-enters the process as Code Blue.

FIG. 6

EVALUATING AND SERVICING PROBLEMATIC CASH-HANDLING MACHINES

TECHNICAL FIELD

Aspects of the disclosure herein relate to determining whether machines, such as banking machines, ATMs, cash handling devices, are problematic and need to be serviced. More specifically, aspects of the disclosure relate evaluating predefined criteria to determine when a machine is problematic for determining how to best resolve issues with a particular machine.

BACKGROUND

Various types of errors are encountered by banking machines, ATMs, cash handling devices, and the like, such as hardware issues in the system, legibility issues with the check images, unexpected system crashes, and the erroneous rejecting of cash or checks. The disclosure herein relates to methods of tracking these errors and determining when a particular machine needs to be serviced or replaced based on the number of errors and the frequency of the errors by the machine.

BRIEF SUMMARY

The following presents a simplified summary of the disclosure in order to provide a basic understanding of some aspects. It is not intended to identify key or critical elements of the invention or to delineate the scope of the invention. The following summary merely presents some concepts of the disclosure in a simplified form as a prelude to the more detailed description provided below.

In one exemplary embodiment, a method of tracking faults in a machine is disclosed. The method comprises determining whether a fault exists in a machine and storing any fault, assigning a classification value ranging from stable to problematic to the machine based on whether there is a fault and evaluating any fault based on a predetermined set of criteria, and outputting the classification value of the cash handing device. The fault can be related to one of the following: hardware, the cash reject rate, image handling, crash rate, user claim rate, and check handling accuracy of the machine. The system can be configured to assign a plurality of classification values based on a predetermined set of criteria. The classification value of the machine can be configured to improve after being classified as problematic when the machine operates without faults for a predetermined time period. The plurality of classification values can be configured to range depending on the duration of the fault. The machine can be considered problematic if it is unavailable for a predetermined amount of time at least once within a predetermined number of days. The tracking information can be used by the processor to determine the predetermined set of criteria.

Aspects of the invention may be provided in a computer-readable medium having computer-executable instructions to perform one or more of the process steps described herein. These and other aspects of the invention are discussed in greater detail throughout this disclosure, including the accompanying drawings.

BRIEF DESCRIPTION OF THE DRAWINGS

The present disclosure is illustrated by way of example and not limited in the accompanying FIGS. in which like reference numerals indicate similar elements and in which:

FIG. 6 shows an exemplary spreadsheet illustrating a report used to identify machines that meet a particular definition.

DETAILED DESCRIPTION

In this patent specification, the applicant uses various headings only for convenience purposes. These headings are not intended in any way limit the scope of the disclosure.

Computing System

Figure 1:
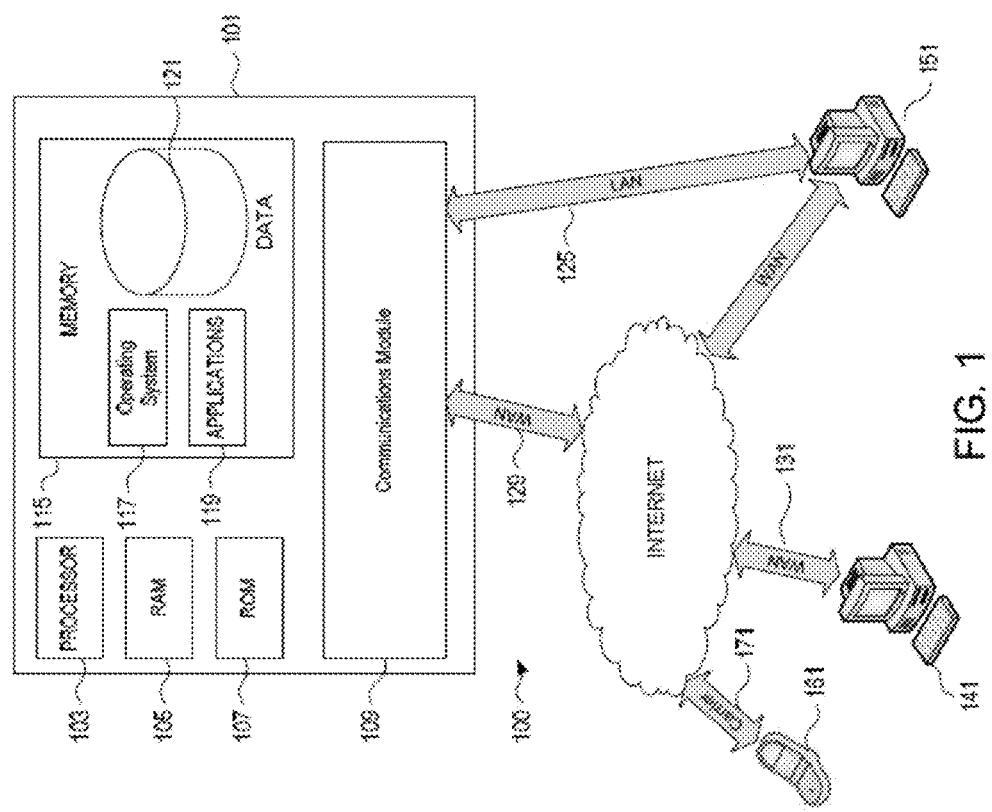
FIG. 1 shows an illustrative operating environment in which various aspects of the disclosure herein may be implemented.

FIG. 1 illustrates an example of a suitable computing system environment 100 for implementing the processes described herein. The computing system environment 100 is only one example of a suitable computing environment and is not intended to suggest any limitation as to the scope of use or functionality of the invention. The computing system environment 100 should not be interpreted as having any dependency or requirement relating to any one or combination of components shown in the illustrative computing system environment 100.

Various embodiments of the invention are operational with numerous other general purpose or special purpose computing system environments or configurations. Examples of well known computing systems, environments, and/or configurations that may be suitable for use with various embodiments of the invention include, but are not limited to, personal computers, server computers, hand-held or laptop devices, multiprocessor systems, microprocessor-based systems, set top boxes, programmable consumer electronics, network PCs, minicomputers, mainframe computers, distributed computing environments that include any of the above systems or devices, and the like.

With reference to FIG. 1, the computing system environment 100 may include a computing device 101 wherein the processes discussed herein may be implemented. The computing device 101 may have a processor 103 for controlling overall operation of the computing device 101 and its associated components, including RAM 105, ROM 107, communications module 109, and memory 115. Computing device 101 typically includes a variety of computer readable media. Computer readable media may be any available media that may be accessed by computing device 101 and include both volatile and nonvolatile media, removable and non-removable media. By way of example, and not limitation, computer readable media may comprise a combination of computer storage media and communication media.

Computer storage media include volatile and nonvolatile, removable and non-removable media implemented in any method or technology for storage of information such as computer readable instructions, data structures, program modules or other data. Computer storage media includes, but is not limited to, random access memory (RAM), read only memory (ROM), electronically erasable programmable read only memory (EEPROM), flash memory or other memory technology, CD-ROM, digital versatile disks (DVD) or other optical disk storage, magnetic cassettes, magnetic tape, magnetic disk storage or other magnetic storage devices, or any other medium that can be used to store the desired information and that can be accessed by computing device 101.

Communication media typically embodies computer readable instructions, data structures, program modules or other data in a modulated data signal such as a carrier wave or other transport mechanism and includes any information delivery media. A modulated data signal is a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media.

Although not shown, RAM 105 may include one or more applications representing the application data stored in RAM memory 105 while the computing device is on and corresponding software applications (e.g., software tasks), are running on the computing device 101.

Communications module 109 may include a microphone, keypad, touch screen, and/or stylus through which a user of computing device 101 may provide input, and may also include one or more of a speaker for providing audio output and a video display device for providing textual, audiovisual and/or graphical output.

Software may be stored within memory 115 and/or storage to provide instructions to processor 103 for enabling computing device 101 to perform various functions. For example, memory 115 may store software used by the computing device 101, such as an operating system 117, application programs 119, and an associated database 121. Alternatively, some or all of the computer executable instructions for computing device 101 may be embodied in hardware or firmware (not shown). Database 121 may provide centralized storage.

Computing device 101 may operate in a networked environment supporting connections to one or more remote computing devices, such as branch terminals 141 and 151. The branch computing devices 141 and 151 may be personal computing devices or servers that include many or all of the elements described above relative to the computing device 101. Branch computing device 161 may be a mobile device communicating over wireless carrier channel 171 or through a wireless LAN or WAN.

The network connections depicted in FIG. 1 include a local area network (LAN) 125 and a wide area network (WAN) 129, but may also include other networks. When used in a LAN networking environment, computing device 101 is connected to the LAN 125 through a network interface or adapter in the communications module 109. When used in a WAN networking environment, the server 101 may include a modem in the communications module 109 or other means for establishing communications over the WAN 129, such as the Internet 131. It will be appreciated that the network connections shown are illustrative and other means of establishing a communications link between the computing devices may be used. The existence of any of various well-known protocols such as TCP/IP, Ethernet, FTP, HTTP and the like is presumed, and the system can be operated in a client-server configuration to permit a user to retrieve web pages from a web-based server. Any of various conventional web browsers can be used to display and manipulate data on web pages.

Additionally, one or more application programs 119 used by the computing device 101, according to an illustrative embodiment, may include computer executable instructions for invoking user functionality related to communication including, for example, email, short message service (SMS), and voice input and speech recognition applications.

Exemplary embodiments discussed herein may include forms of computer-readable media. Computer-readable media include any available media that can be accessed by a computing device 101. Computer-readable media may comprise storage media and communication media. Storage media include volatile and nonvolatile, removable and non-removable media implemented in any method or technology for storage of information such as computer-readable instructions, object code, data structures, program modules, or other data. Communication media include any information delivery media and typically embody data in a modulated data signal such as a carrier wave or other transport mechanism.

Although not required, one of ordinary skill in the art will appreciate that various aspects described herein may be embodied as a method, a data processing system, or as a computer-readable medium storing computer-executable instructions. For example, a computer-readable medium storing instructions to cause a processor to perform steps of a method in accordance with aspects of the invention is contemplated. For example, aspects of the method steps disclosed herein may be executed on a processor on a computing device 101. Such a processor may execute computer-executable instructions stored on a computer-readable medium.

Figure 2:
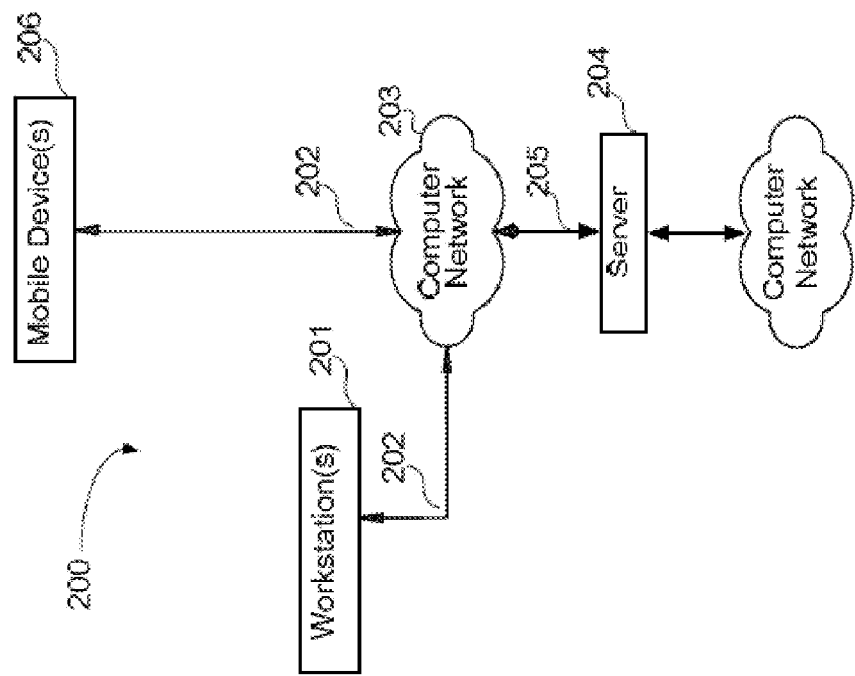
FIG. 2 is an illustrative diagram of workstations and servers that may be used to implement the processes and functions of certain aspects of the disclosure herein.

Referring to FIG. 2, an illustrative system 200 for implementing exemplary methods disclosed herein is shown. As illustrated, system 200 may include one or more workstations 201. Workstations 201 may be local or remote, and are connected by one of communications links 202 to computer network 203 that is linked via communications links 205 to server 204. In system 200, server 204 may be any suitable server, processor, computer, or data processing device, or combination of the same. Server 204 may be used to process the instructions received from, and the transactions entered into by, one or more users.

Computer network 203 may be any suitable computer network including the Internet, an intranet, a wide-area network (WAN), a local-area network (LAN), a wireless network, a digital subscriber line (DSL) network, a frame relay network, an asynchronous transfer mode (ATM) network, a virtual private network (VPN), or any combination of any of the same. Communications links 202 and 205 may be any communications links suitable for communicating between workstations 201, mobile devices 206, and server 204, such as network links, dial-up links, wireless links, hard-wired links, and the like.

As understood by those skilled in the art, the system and steps that follow in the FIGS. may be implemented by one or more of the components in FIGS. 1 and 2 and/or other components, including other computing devices.

Exemplary embodiments herein are directed to tracking system errors by banking machines, ATMs, or cash handling devices to determine whether a particular machine is problematic. It is contemplated that these devices can be used for any bank-related function including, but not limited to withdraws, deposits, paying bills, checking account balances, printing statement balances, updating passbooks, applying for loans, and the like. In addition, it is contemplated that the systems and methods described herein could be applied to any other automated transaction machines, such as adding prepaid amounts to credit cards or calling cards and the like, renting items such as movies, music, or books, and the like, purchasing various items, such as postage stamps, lottery tickets, train tickets, concert tickets, movie tickets, shopping mall gift certificates, gift cards, drinks, beverages, and other like items.

In one embodiment the detectable errors may include hardware issues, problems with check images, unexpected system crashes, and erroneous rejecting of cash or checks. In exemplary embodiments, these errors can be tracked and it can be determined when a particular machine needs to be serviced or replaced based on the number of errors and frequency of the errors by the machine.

Determining Problematic Machines

Figure 3:
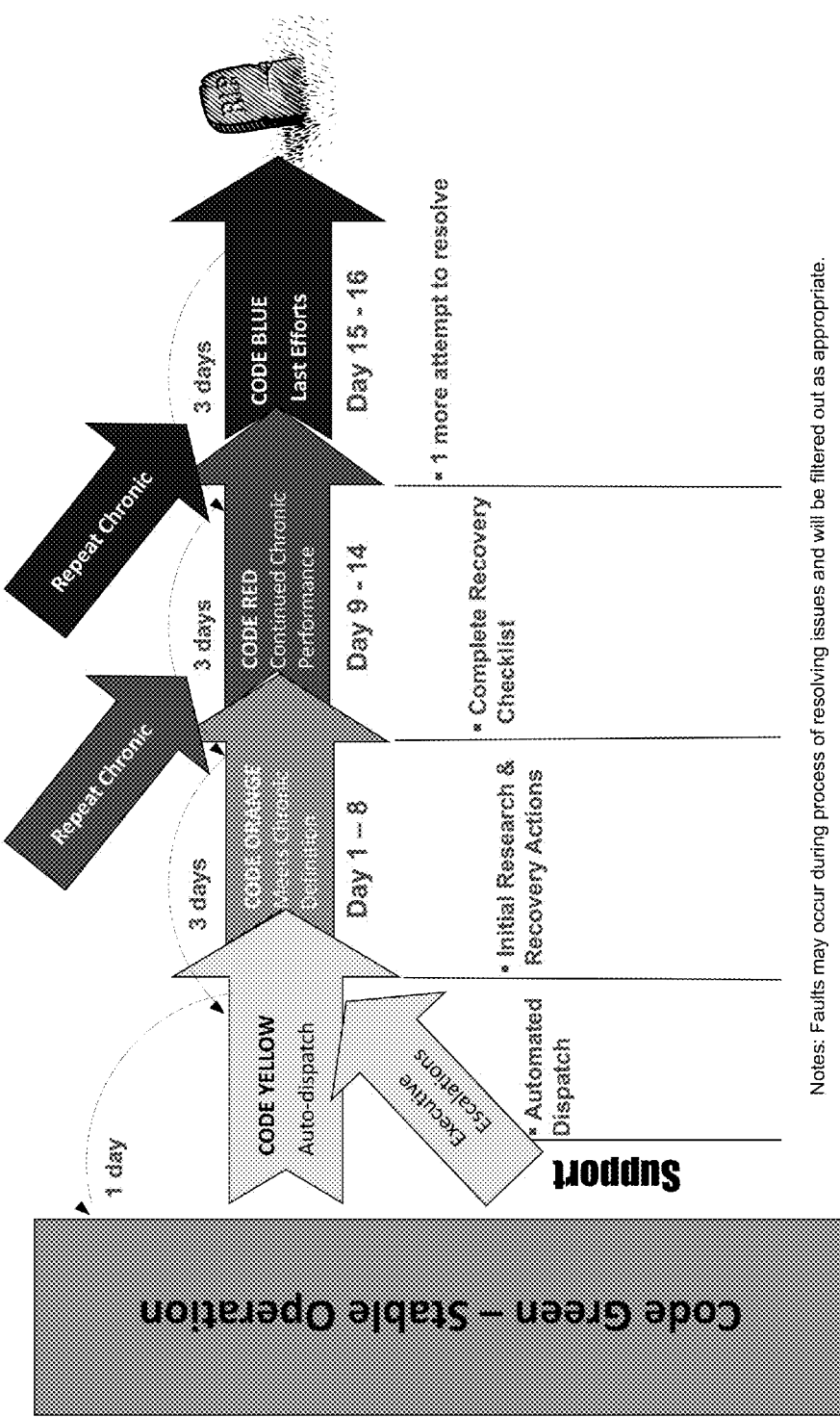
FIG. 3A illustrates a flow chart depicting a process in accordance with one exemplary embodiment.
FIG. 3B illustrates exemplary rules for determining whether a machine can be classified as problematic.

FIG. 3B provides a summary of exemplary rules for determining whether a machine can be classified as problematic in accordance with the description herein.

Referring to FIG. 3B, in one exemplary embodiment, the machine can be considered problematic or chronic if at least two of the following items I-V categories are met. Each of these categories is summarized in FIG. 3B under item no. 1. Other conditions and thresholds are contemplated for classifying the machines as problematic.

Category I—Chronic Ticket Failures

Category I (Chronic Ticket Failure) occurs where a machine receives one or more chronic tickets in a predetermined time period, such as seven (7) to fifteen (15) days. In one exemplary embodiment, a Chronic ticket is a ticket that is automatically generated by a monitoring system based on a Chronic threshold table. This table identifies the number and timeframe for each type of Chronic ticket, for example, chronic dispenser failures, chronic communications failures, and the like. In one example, the table can include a count of 10 and timeframe of 24 hours for the chronic communications failures threshold. This means that if the cash handling machine has 10 communication-type faults in a 24 hour period, the monitoring system will generate a Chronic communications failure ticket. In another example, the system can track the hardware faults in a particular machine by using Chronic tickets. In particular, the system can track the hardware faults in a machine by issuing Chronic tickets and tracking the number and the frequency of the Chronic tickets and issue a Chronic ticket failure based on a predetermined number of hardware faults in a certain time period. In other example, chronic tickets can also be manually created by operations staff, based on visual reports or based on a request from an executive or other manager. A ticket is opened automatically when one of the conditions defined in the Chronic Threshold Table is met. In another example five dispenser failures in five days would automatically open a chronic dispenser failure ticket.

Category II—Prolonged Downtime Weekly

Category II (Prolonged Downtime Weekly) can occur when a machine has more than thirty (30) minutes of down time for four (4) out of seven (7) days for an issue in any category. However, any length of time that the device is down and any number of days are contemplated for evaluating the machines' prolonged downtime. The issue subcategories in Category II may include cashout problems, communication issues, daily balancing issues, deposit issues, hard fault issues, host down issues, and statement/receipt printer issues and the like.

Category III—Prolonged Downtime (Three Consecutive Days)

Category III (Prolonged Downtime Three Consecutive Days) can occur where a machine has more than thirty (30) minutes of downtime for three (3) consecutive days for any common or reoccurring issue. Again, any length of time that the device is down and any number of days are contemplated for evaluating the machines' prolonged downtime.

Category IV—Low Average Availability

Category IV (Low Average Availability) can occur where a machine's average availability is below ninety (90) % for the prior two (2) to three (3) months. However, any threshold percentage for determining whether a machine has low average availability is contemplated.

Category V—High Defect Rate

Category V (High Defect Rate) can occur where a machine's two-week average defect rate is greater than four percent. The defect rate in category (V) may consist of failed customer interactions (FCIs) and can be expressed as a percentage. Defect Rate is FCI Defects per Million Opportunities ("DPMO") expressed as a percentage. This can be calculated taking the FCI and dividing by the total transactions. FCIs can be based on historical transaction volumes and types for the time periods that the machine has a fault or is out of service. The system can be configured to track many different faults for reporting and tracking defects. However, any threshold percentage for determining whether a machine has a high defect rate is contemplated.

In addition to meeting two or more of categories (I)-(V), if the machine has a low amount of transactions and experiences a certain threshold criteria, the machine can be considered problematic. Referring to item no. 2, in FIG. 3B, if the machine is the only machine at a particular location and conducts a certain number of transactions (in one example at least 8,000 transactions in the previous month), this machine can be considered Chronic if it meets any one of the categories (I)-(V). In one example, this may exclude the Category I Chronic Ticket failures.

Cash Reject Rate Chronic

Referring now to item no. 3, in FIG. 3B, the cash reject rate in a particular machine can be tracked to determine whether the cash handing device needs to be serviced or replaced. The cash reject rate can be calculated by taking the number of notes accepted divided by the number of notes deposited. In one exemplary embodiment, if the daily cash reject rate (the machine rejects valid currency) is greater than 10% for 5 or more days within a 7-day period, the machine can be considered problematic or chronic. The period under consideration can be the number of days that the machine is available for customer transactional use and cash reject data is available. For example a machine can be considered no longer problematic when the daily cash reject rate is less than 10% for 3 consecutive days. The cash reject rate can be determined by taking the number of notes rejected and dividing by the number of notes processed.

Image Quality Chronic

Referring to item no. 4, in FIG. 3B, another machine issue that may occur is where the images transmitted by the machine to the central processing system are not legible. The machine reads and creates an electronic image (JPG file) of the front and back of the check when the customer deposits it. This image is then transmitted for processing and clearing. The check must be legible and contain all required components (for example the payee, payor signature, routing number, account number, legal amount, date, and the like). In one embodiment, the system can track whether and how often physical checks are retrieved from the machine due to the checks transmitted being unreadable. In one exemplary embodiment, a machine can be considered problematic when more than 3 physical checks are requested in 1 day. In one example, the particular machine can be considered no longer problematic when less than 4 images are requested in 1 day.

Chronic Crash Tracking

Referring now to item no. 5 in FIG. 3B another potential issue in machines is the amount of system crashes. The monitoring system can be configured to keep track of the number and frequency of system reboots encountered by a particular machine. In one exemplary embodiment, if the machine experiences 3 application reboots in a 7-day period, the machine can be considered problematic. The machine can be considered no longer problematic when the application reboots are less than 3 in a 7-day period.

Deposit Claims

Referring to item no. 6, in FIG. 3B another type of error that can occur in a machine. If a machine with 6 or more Deposit Claims in a 7-day period, then the machine can be considered problematic. For example, if the machine commits 6 or more deposit errors in a 7-day period then the machine can be considered problematic.

Missing Check Image Chronic

Referring to item no. 7, in FIG. 3B, another type of error that can be tracked by the monitoring system for determination of a problematic machine is the number of times and frequency the machine is missing check images from particular transactions. If a machine has 5 or more missing check images or unmatched External Markup language ("XMLs") in one day, the machine can be considered problematic. This is problematic because it creates unneeded manual work for banks. For example, when the image of the check is not uploaded for processing, an exception (XML) is produced, which must be manually cleared by retrieving and processing the physical paper check by bank personnel. Also this also creates unnecessary expenses for banks, because an armored courier must make a special trip to the site to retrieve the physical checks. Once the machine is properly downloading images, it can be considered no longer problematic by the system.

Check Reject Rate Chronic

Referring now to item no. 8, in another exemplary embodiment, the system can monitor the check reject rate faults in a particular machine to determine whether the cash handing device needs to be serviced or replaced. A machine can be considered problematic or chronic when the daily check reject rate is greater than a predetermined percentage for 5 or more days within a 7-day period, which can be the number of days that the cash machine is available for use and/or the number of days that the check reject rate is available. The cash handing device can be considered no longer problematic when the daily check reject rate is less than a certain percentage for 3 consecutive days over the evaluation period. The check reject rate can be determined by taking the number of checks improperly rejected and dividing by the number of checks processed.

Figure 4:
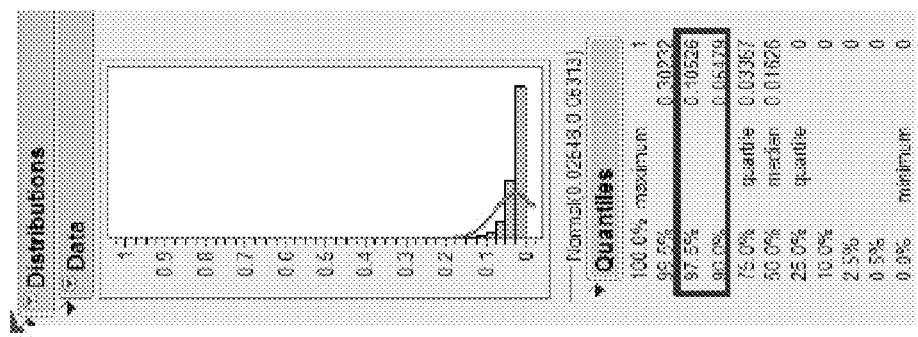
FIG. 4 shows an exemplary method of determining an appropriate cash reject rate in accordance with an exemplary embodiment disclosed herein.

The cash reject chronic analysis is conducted by collecting data for each category to establish the current performance baseline. The target or goal performance level may be calculated by evaluating the outliers and coupling that information with a subjective determination of what is a reasonable expectation of improvement. The acceptable cash reject rate can be determined by analyzing previous cash reject rates. In particular, the distribution as shown in FIG. 4 of the cash reject rate data can be reviewed to determine acceptable evaluation criteria for determining what the achievable cash reject rate should be for the machines. FIG. 4 is a graph of the statistical distribution of daily cash reject rates of an example network of machines over a several week period. From this data, the baseline performance level (i.e., the average level of most of the network) can be established. This method can also be used to set the percentage threshold for any of the above conditions and percentages in classifying problematic machines. The system can be configured to track and store each fault and this data can be analyzed for determining whether a machine is operating properly.

Color-Coding Process

In another embodiment, each machine can be classified with a classification value based on whether the machine is operating properly or how long the machine continues to meet the Chronic ATM Definition. In one embodiment, the classification system can be color coded. However, any other types of classification systems such as using numbers, letters, and the like are contemplated.

For exemplary purposes, the machines can be assigned classification values based on the following classification system. A property operating machine with no faults or infrequent faults can be considered a Code Green or Code Yellow. Problematic machines can be assigned one of Code Orange, Code Red, or Code Blue. A machine is considered Code Orange when it meets a fault threshold predetermined definition for the first time in 8 weeks. A machine that meets the fault threshold predetermined definition for 8 consecutive days or if the machine is a repeat chronic within 8 weeks can be considered a Code Red. A machine that meets the definition for 14 consecutive days or if the cash handing device is a repeat chronic 4 times in 8 weeks can be considered a Code Blue. However, if the machine falls into one of the problematic categories, Code Orange, Code Red, or Code Blue, the machine classification will improve one classification value when it runs without faults for a certain period, such as 1 to 3 consecutive days. For example, if a machine is assigned the classification value of Code Red and it operates without faults for 1 to 3 consecutive days, it will be reclassified as a Code Orange.

FIG. 3A shows a flow chart of an exemplary coding system. Code green indicates that the machine is running in a stable condition. If the machine's condition becomes problematic as defined above it is reclassified as a Code Orange. If the machine remains problematic for 9 or 11 days, it is then reclassified a more problematic value, Code Red. In one example, after 15 or 17 days of operating problematic the machine is classified as a Code Blue, which is considered the most problematic value under the exemplary classification system. Once the machine is assigned the Code Blue value, the system can dispatch a service team, and the service team can make one more attempt to resolve the issue(s) in the machine. If the issue(s) are not resolved, then the appropriate steps can be taken to replace the machine.

However, again, during any point once a problematic classification is assigned to a particular machine as discussed above, the machine can be reclassified at the next lower classification value if the machine behaves properly for a certain time period such as 1 to 3 days. For example, when the machine's condition is improving, it can be reclassified as a Code Yellow. Ultimately, however, the goal is to continuously monitor and to maintenance a machine until the machine is performing at the Code Green level.

Reporting

Figure 5:
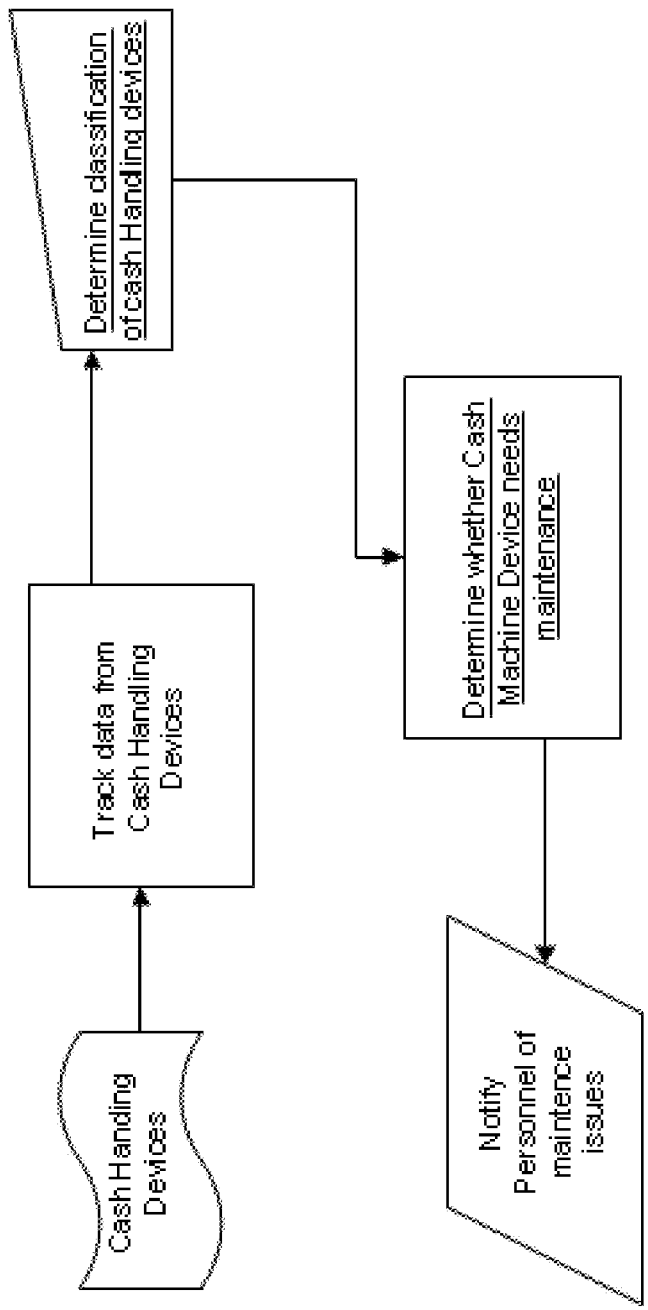
FIG. 5 depicts an exemplary flowchart in accordance with an exemplary embodiments disclosed herein.
Figure 6:
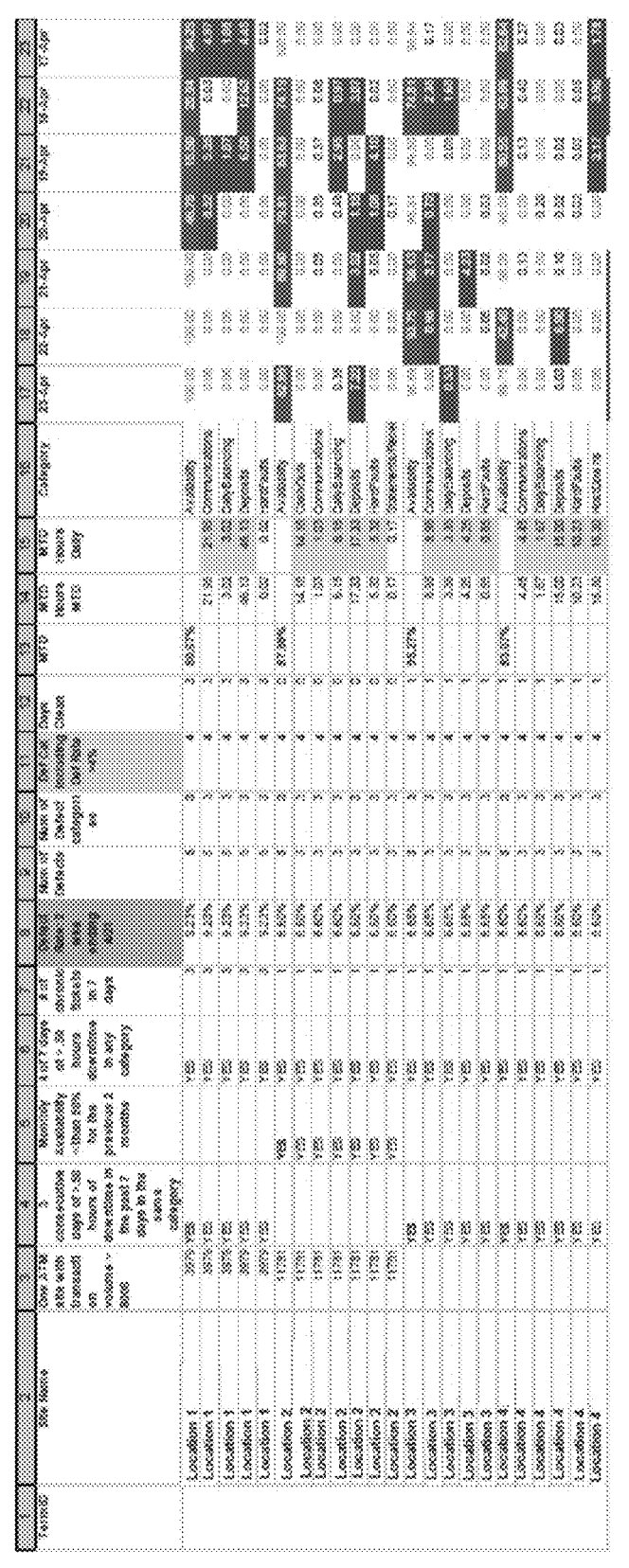

FIG. 6 shows an exemplary spreadsheet illustrating a report used to identify machines that meet a particular definition. Column 3 of the spreadsheet in FIG. 6 contains the monthly transaction volume from the previous complete month if the machine is a "Banking Center single ATM site"; or where there is only one machine at a particular banking center location. Columns 4 through 6 contain YES if the machine meets the specified criteria identified in the particular column. Column 11 contains a count of the number of criteria factors met. In one example, if this is 2 or more on any particular machine that are not single-site machines, or 1 or more on machines that are single-site machines that are running 8000 or more monthly transactions and where the 1 factor is not 1 or more Chronic tickets, then the machine meets the hardware definition and can be deemed Chronic. All other columns are included to facilitate identification of the machine and research of the machine's performance Methods of Operation A flow chart detailing the overall method of operation of the machine monitoring system is shown in FIG. 5. The overall system is able to track faults in a plurality of machines. The system monitors a plurality of machines and stores this data system in a computer memory. Based on the criteria listed above, a processor is configured to provide a classification of the machine, which in one embodiment can be based on the frequency and number of the faults. The processor can then (based on the classification of the cash handing device) determine whether the cash handing device needs to be serviced. The appropriate personnel can then be notified that a particular cash handling machine or a group of cash handling machines need to be serviced or other appropriate action can be taken.

It will be recognized by those skilled in the art that the illustrated embodiments can be modified in arrangement and detail without departing from the scope of the present invention.

We claim:

1. A computer-implemented method comprising:
   determining whether a determined fault exists in a cash-handling machine;
   when the determined fault occurs, assigning a first chronic value to the cash-handling machine based on a predetermined set of criteria, wherein the determined fault comprises at least one of a cash reject rate fault type, an image handling fault type, a crash rate fault type, a user claim rate fault type, and a check handling accuracy fault type;
   outputting the first chronic value of the cash-handling machine; and
   when the cash-handling machine is assigned the first chronic value and the cash-handling machine operates without faults for a predetermined time period without servicing, re-assigning a second chronic value to the cash-handling machine, wherein:
      the second chronic value corresponds to a less problematic condition than the first chronic value.

2. The computer implemented method of claim 1 further comprising configuring a plurality of chronic values to range depending on a fault duration.

3. The computer implemented method of claim 1 wherein the cash-handling machine is considered problematic if it is unavailable for a predetermined amount of time at least once within a predetermined number of days.

4. The computer implemented method of claim 1 wherein tracking information is used to determine the predetermined set of criteria.

5. An apparatus comprising:
   a processor for executing computer-executable instructions; and
   one or more memories storing the computer-executable instructions that, when executed, cause the apparatus to perform a method comprising:
      determining whether a determined fault exists in a cash-handling machine;
      when the determined fault occurs, assigning a first chronic value to the cash-handling machine based on a predetermined set of criteria, wherein the determined fault comprises at least one of a cash reject rate fault type, an image handling fault type, a crash rate fault type, a user claim rate fault type, and a check handling accuracy fault type;
      outputting the first chronic value of the cash-handling machine; and
      when the cash-handling machine is assigned the first chronic value and the cash-handling machine operates without faults for a predetermined time period without servicing, re-assign a second chronic classification value to the cash-handling machine, wherein:
         the second chronic value corresponds to a less problematic condition than the first chronic value.

6. The apparatus of claim 5 wherein a plurality of chronic values is configured to range depending on a fault duration.

7. The apparatus of claim 5 wherein the cash-handling machine is considered problematic if it is unavailable for a predetermined amount of time at least once within a predetermined number of days.

8. The apparatus of claim 5 wherein the processor is configured to use tracking information to determine the predetermined set of criteria.

9. A computer program product, comprising a computer usable, non-transitory medium having a computer readable program code embodied therein, said computer readable program code adapted to be executed by a processor to implement a method comprising:
   determining whether a determined fault exists in a cash-handling machine;
   when the determined fault occurs, assigning a first chronic value to the cash-handling machine based on a predetermined set of criteria, wherein the determined fault comprises at least one of a cash reject rate fault type, an image handling fault type, a crash rate fault type, a user claim rate fault type, and a check handling accuracy fault type;
   displaying the classification value of the cash-handling machine; and
   when the cash-handling machine is assigned the first chronic value and the cash-handling machine operates without faults for a predetermined time period without servicing, re-assign a second chronic value to the cash-handling machine, wherein:
      the second chronic value corresponds to a less problematic condition than the first chronic value.

10. The computer program product of claim 9 wherein the cash-handling machine is considered problematic if it is unavailable for a predetermined amount of time at least once within a predetermined number of days.

11. The computer program product of claim 9 wherein the processor is configured to determine the predetermined set of criteria based on tracking information.

* * * * *